Jan. 18, 1949.   C. J. HALBORG   2,459,697
BROACHING MACHINE
Filed Jan. 25, 1945   4 Sheets-Sheet 1

FIG. 1.

INVENTOR.
Carl J. Halborg.
BY
Harness, Dickey & Pierce.
ATTORNEYS.

Jan. 18, 1949.　　　C. J. HALBORG　　　2,459,697
BROACHING MACHINE

Filed Jan. 25, 1945　　　　　　　　　　4 Sheets-Sheet 3

INVENTOR.
Carl J. Halborg.
BY
Harness, Dickey & Pierce
ATTORNEYS.

Jan. 18, 1949.  C. J. HALBORG  2,459,697
BROACHING MACHINE
Filed Jan. 25, 1945  4 Sheets-Sheet 4

INVENTOR.
Carl J. Halborg.
BY
Harness, Dickey & Pierce.
ATTORNEYS.

Patented Jan. 18, 1949

2,459,697

UNITED STATES PATENT OFFICE 2,459,697

BROACHING MACHINE

Carl J. Halborg, New Baltimore, Mich., assignor to Colonial Broach Company, Warren Township, Macomb County, Mich., a corporation of Delaware Application January 25, 1945, Serial No. 574,509

27 Claims. (Cl. 90—33)

The present invention relates to surface broaching machines.

It has been the standard practice in surface broaching to construct a special broach for each machining operation with the proper tooth stepping and the proper number of teeth to complete a given machining operation on a particular workpiece in one pass of the broach over the work. Standardization of broaches has not been possible because the depth of cut per tooth (i. e. the amount of step between successive teeth) must be selected for each job since it depends on the material of the workpiece, the length of surface to be cut as compared with the power available in the machine which is to be used, and also on the strength and rigidity of the workpiece itself. Since broaching tools are expensive and have been limited by their design to the performance of a particular operation, broaching has only been employed where a large number of identical parts must be finished. In addition, broaching machines are either limited in their range of operations by reason of their limited stroke, or, if designed to take a long broaching stroke, are of excessive size and cost. In a few instances, broaching machines have been constructed to make a plurality of successive strokes with the same broach on the same workpiece in order to reduce the size of the machine required to cut away metal to a given depth, but no satisfactory means for adjusting the depth of cut per tooth has been suggested and, therefore, no one has devised a practical machine which may be used economically for machining only a few pieces of one kind, as is frequently required in job shops or tool making.

Accordingly, it is the general object of the invention to provide a surface broaching machine capable of performing a wide range of broaching operations with a single broaching tool in order to avoid the necessity of securing a special tool for each different operation.

Another object is to provide a surface broaching machine which will automatically remove any desired depth of metal by repeated strokes of a relatively short broaching tool in order to reduce the size of the machine which would otherwise be required to remove all of the metal in one stroke.

Another object of the invention is to provide a surface broaching machine incorporating improved means for controlling and adjusting the depth of cut of each tooth of the tool, as distinguished from the usual broaching operation in which the depth of cut is determined solely by the stepped relation of the tool teeth.

Another object of the invention is to provide a machine of the type mentioned in which upon adjustment for the depth of cut per tooth and the total depth of metal to be removed will automatically perform the necessary number of strokes required to complete the broaching operation.

Another object of the invention is to provide a surface broaching machine of the type mentioned in which the depth of cut per tooth may be reduced during the broaching operation in order to permit an initial rapid rough cutting operation followed, after cutting to a predetermined depth, by a semifinish cutting operation on the same tool.

Another object of the invention is to provide a machine of the type mentioned adapted to make a longer stroke after the workpiece has been cut to size in order to bring into action special finishing teeth which do not engage the workpiece during the normal roughing or semifinishing strokes.

Other objects of the invention will become apparent from the following specification, the accompanying drawings, and the appended claims:

In the drawings, only those portions of the machine essential to an understanding of the invention are illustrated. It will be understood that the remaining structural features may be of any desired or conventional construction.

Figure 2:
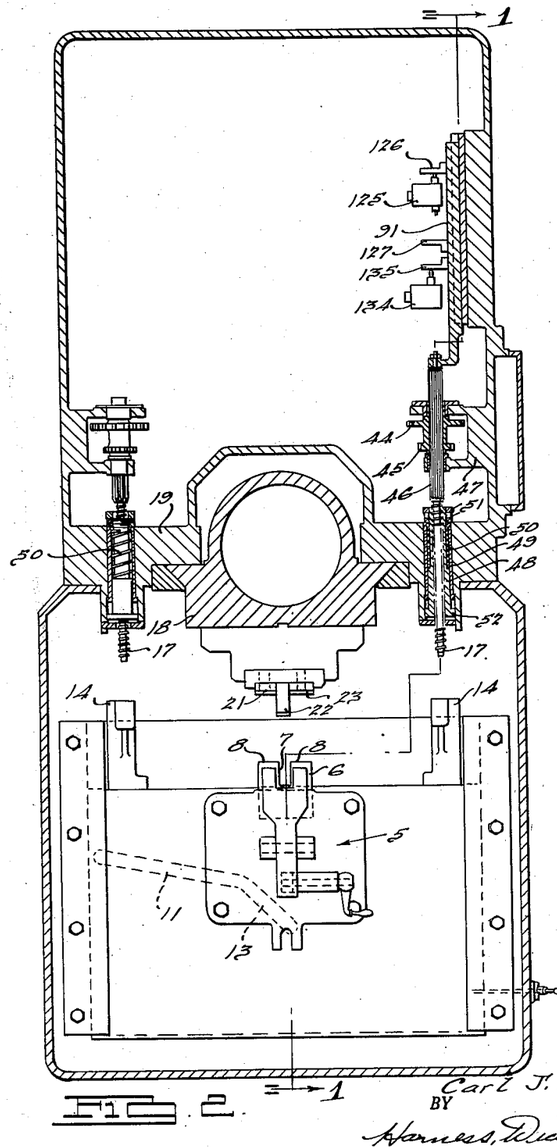
Figure 2 is a horizontal section taken on the line 2—2 of Figure 1.

The machine comprises a generally box-shaped frame having a forwardly projecting portion 2 provided with a stationary support 3 for a worktable 4 which is reciprocable toward and away from the path of movement of the broaching tool in suitable ways formed in the support 3. The worktable 4 carries any suitable form of workholding fixture, such as the fixture indicated generally at 5, for holding a workpiece 6. As best shown in Figure 2, the machine illustrated is constructed to machine a slot 7 in the workpiece 6 and also finish the surfaces 8 of the workpiece. The worktable is reciprocated by means of a reciprocating cylinder 9 which carries a cam plate 10 having a cam slot 11 shaped as best illustrated in the dotted line in Figure 2. The cam slot 11 receives the lower end of a pin 12 fixed in the worktable 4. For further details of the construction of the worktable moving mechanism reference may be had to Patent No. 2,385,119 of Benedict Welte, granted September 18, 1945.

It is sufficient only to note here that the cam slot 11 is formed with a relatively steep portion 13 at one end for effecting a rapid inward movement of the table toward the broach, while the remainder of the cam slot extends at such an angle that it is irreversible by or self-locking with respect to any force exerted upon the table by the broaching tool. That is to say, the reaction of the tool upon the work, no matter how great, cannot force the table outwardly even though the hydraulic cylinder 9 exerts no pressure.

Figure 4:
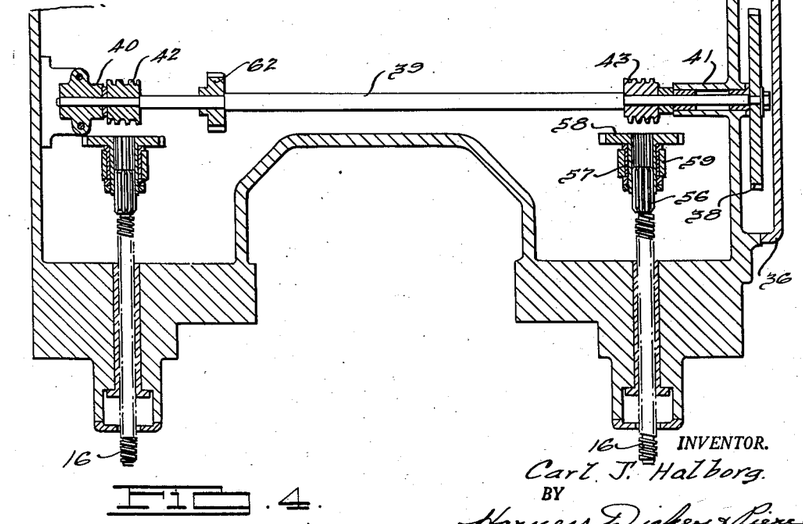
Figure 4 is a horizontal section taken on the line 4—4 of Figure 1.

The workpiece is so positioned in fixture 5 that the broaching operation will be entirely complete when a pair of abutments 14 on the table 4 engage a pair of stationary abutments 15 secured to the frame of the machine. Each of the abutments 14 is also constructed to co-operate with a pair of retractable abutment screws 16 and 17, the respective pairs of abutment screws being positioned at opposite sides of the machine as best shown in Figures 2 and 4.

Figure 1:
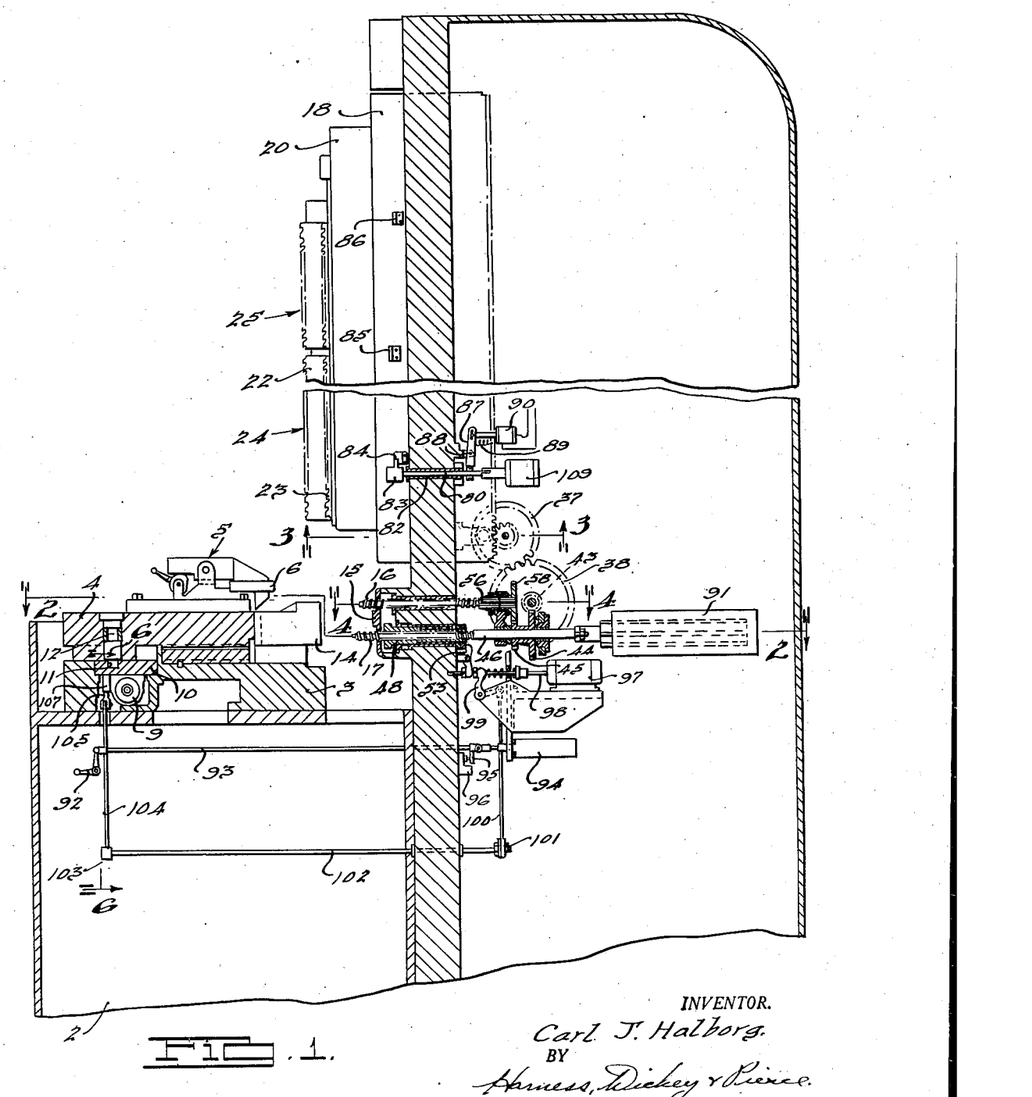
Figure 1 is a vertical section through the machine taken generally on the line 1—1 of Figure 2.

The machine also incorporates a broaching ram 18 slidable vertically in suitable ways carried by the main column 19 of the machine. The broaching ram, as illustrated, is in the form of a movable cylinder which may be consturcted in a manner more fully disclosed in the application of Benedict Welte, Serial No. 495,856, filed July 23, 1943, and now Patent No. 2,395,702, granted Feb. 26, 1946. The face of the broaching ram 18 carries a tool supporting fixture 20 for a composite broaching tool made up of the three broaches 21, 22 and 23, shown best in Figures 1 and 2. As best shown in Figure 1, the broaching tools are divided horizontally into lower cutting sections indicated generally at 24 and shorter upper finishing sections indicated generally at 25. As will appear hereafter, the finishing sections 25 are brought into action only after the workpiece is cut to size by the cutting sections 24 and thus act principally to improve the finish of the completed part.

An important characteristic of the broaching tool employed in connection with the present invention resides in the fact that the teeth of both the upper and lower portions are not stepped in the usual fashion, but on the contrary project equal distances from the axis of movement of the broaching ram. The cutting operation of the teeth is achieved by feeding the work in toward the broaching tool during the broaching stroke and consequently the depth of cut per tooth is controlled by the rate of such inward feed. This mode of operation is made possible by reason of the fact that the means for feeding the worktable into the broach during the cutting stroke incorporates an irreversible or self-locking cam slot 11 which positively advances the table independent of the reaction of the force exerted upon the workpiece by the broaching tool. Means are provided for positively controlling the rate of inward feed independent of the magnitude of the forces involved. This means comprises mechanism for rotating the feed screws at the desired rate of speed. Since the screws are, themselves, irreversible or self-locking helical cams it is apparent that the combination of the hydraulically operated irreversible cam 11 and the rotating screws 16 and 17 positively control the position and rate of advance of the table regardless of the force exerted on the work by the broach.

Figure 3:
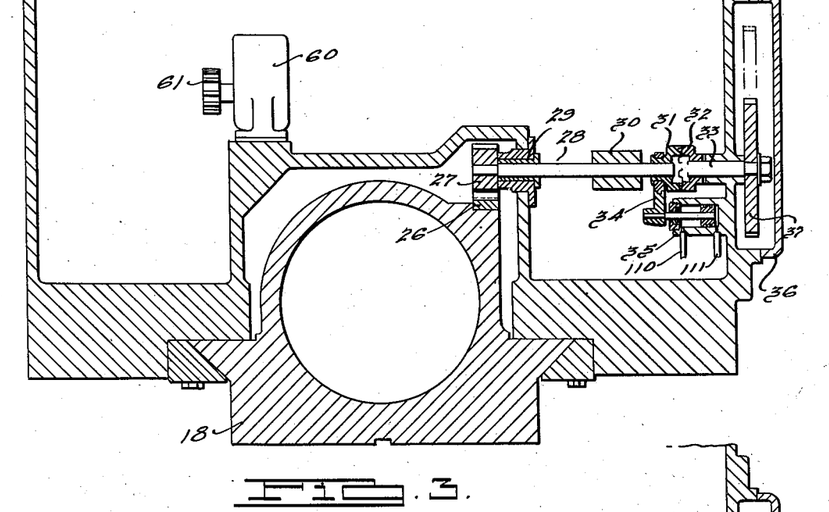
Figure 3 is a horizontal section taken on the line 3—3 of Figure 1.

To insure that the depth of cut per tooth is positively maintained, the screws 16 and 17 are mechanically driven by the broaching ram. As best shown in Figure 3, the broaching ram 18 carries a vertically extending rack 26 which is in constant mesh with a pinion 27 fixed to a shaft 28 journaled in suitable bearings 29 and 30 carried by the frame of the machine. Shaft 28 has splined thereto a dog clutch element 31 adapted to co-operate with a mating dog clutch 32 fixed to a shaft 33 journaled in the right-hand side wall of the machine. The dog clutch element 31 may be slid to the left from the position shown in Figure 3 by means of shifter fork 34 actuated by a hydraulic piston cylinder unit 35 to disengage the shafts 28 and 33. Suitable means are provided to cause such disengagement at the end of each downward or cutting stroke of the ram and to re-engage the clutch elements 31 and 32 upon completion of the upward or return movement of the ram. The clutch elements 31 and 32, in combination with the piston and cylinder unit 35, constitute a one-way drive connection between the rack 26 and the shaft 33.

The outer end of the shaft 33 terminates within an external housing having a removable cover 36, and carries a gear 37. The gear 37 meshes with a gear 38 likewise located within the external housing. Gear 38 is fixed to a shaft 39 which extends entirely across the machine and is journaled adjacent its ends in suitable bearings 40 and 41. Fixed to the shaft 39 is a pair of worm gears 42 and 43 which drives, respectively, the two pairs of abutment screws 16 and 17.

Since the construction of each of the two pairs of abutment screws is identical except as hereafter expressly pointed out, only the right-hand pair, as viewed in Figures 2 and 4, need be described. As best shown in Figure 1, the worm gear 43 meshes with a worm wheel 44, which in turn carries a gear 45. The worm wheel 44 and gear 45 are carried by a splined shaft 46 which is fixed at its forward end to the rear end of the abutment screw 17 and are held against axial movement by means of the arms of a generally fork-shaped support 47 which carries the bearings for the splined shaft 46.

The abutment screw is threaded through a sleeve 48 which is slidably mounted within a guide sleeves 49 fixed in a suitable opening extending through the main column 19 of the machine. A helical spring 50, positioned between the sleeves 48 and 49 adjacent their rearward ends, normally acts to hold the sleeve 48 together with the abutment screw 17 and the splined shaft 46 in their forward position illustrated in Figure 2. Further forward movement of the sleeve 48 is prevented by means of a pair of lock nuts 51 secured to the rear end of the sleeve 48 and bearing against the rear end of the sleeve 49.

The sleeve 48 is movable rearwardly under the influence of a pressure applied to the forward end of the screw 17 to a position in which the shoulder 52 at the forward end of the sleeve 48 engages the forward end of the sleeve 49. This movement occurs as the worktable moves into broaching position, thereby operating a lever 53 pivoted to the column of the machine and having one end engaging the rear end of sleeve 48. This movement of the lever 53 is relied upon to operate a control instrumentality which starts the broaching ram on its downward or cutting stroke. Since the worktable cannot move toward the broach any more than it is permitted to do so by the abutment screw 17, it will be apparent that the abutment screw 17 controls the position of the workpiece relative to the broach throughout the broaching stroke. However, due to the connections between rack 26 and the abutment screw 17 previously described, the screw will be slowly rotated in a direction to permit progressive advance of the worktable throughout the broaching stroke. The speed of such advance may be readily adjusted by changing the relative sizes of the gears 37 and 38, which are conventional change-speed gears of a type available on the market in standard sets at relatively low cost. The arrangement is such that a standard set of change-speed gears will provide a full range of adjustment of the depth of cut per tooth. Such adjustments are required to take care of changes in the character of the material being operated upon, the length of cut in relation to the capacity of the machine and the strength and rigidity of the workpiece, etc.

As is well known, the conventional surface broach is provided with an initial set of roughing teeth which cut to a relatively great depth per tooth. However, when a broaching tooth is cutting to maximum depth it produces an inferior finish and therefore it is customary to follow the roughing teeth with a series of teeth which are so stepped as to cut a smaller depth per tooth to bring the part to approximately final size with a finer finish. In order to achieve the same results with the present mechanism there is provided an auxiliary slow-speed abutment screw 16 which is not engaged by the abutment 14 on the table until just before the abutment 14 engages the fixed abutment 15. The abutment screw 16 has secured at its rearward end a splined shaft section 56 fitted within a splined opening in the sleeve 57 of a gear 58 which, in turn, is in mesh with the previously mentioned gear 45. The sleeve 57 of gear 58 is journaled within the fixed bearing 59. On starting the machine from the position shown in Figure 1, both of the feed screws 16 and 17 will be progressively withdrawn during each successive downward or broaching stroke, but the screw 16 will be withdrawn at a slower rate than the screw 17, with the result that screw 17 will eventually overtake screw 16 and the latter will then act as the controlling abutment for the worktable. The parts may be permanently arranged so that the abutment screw 16 takes control when the abutment 14 is spaced from the fixed abutment 15 by the total depth of cut required to remove the inferior finish produced by the roughing or heavy cuts. Since this amount is normally less than the total depth of cut per stroke the reduced feed will ordinarily begin during the last stroke of the lower portion of the broach.

The abutment screws 16 and 17 are duplicated on the opposite side of the machine in order to provide abutments for the table located at opposite sides of the point of application of the table-moving force in order to prevent any tendency of the table to cock. The structure and functioning of the second set of abutment screws is identical to that just described except that the initial free sliding movement of the internally screw threaded sleeve for the second abutment screw 17 performs no function, and therefore may be omitted if desired.

After the fixed abutments 14 and 15 engage no further inward movement of the table will occur, but the broaching ram will continue its stroke until it is completed. The teeth on broach 24 which pass over the work after the fixed abutments engage each other will perform a finishing operation in the same manner as the unstepped finishing teeth of a conventional broach. In addition they finish the workpiece face to a true parallel with the path of movement of the broach, a result that cannot be achieved while the work is being fed into the broach. However, in order to provide a better finish and also to take care of the possibility that the abutments 14 and 15 engage just at the end of the normal broaching stroke of broach 24, the machine is constructed to provide a final stroke of extra length in order to bring into action the short finish broach section 25 after the abutments engage each other. This result is accomplished in the following manner:

The machine is provided with a shaft 80 which is rotated in one direction upon completion of the broaching stroke of the ram, and in the opposite direction upon completion of the return stroke, and through such rotation operates a control instrumentality to initiate the table return and the table advance movements respectively. In addition, the shaft 80 will operate any suitable control instrumentality to stop the downward movement of the broaching ram upon completion of its broaching stroke. The shaft 80 is journaled in a sleeve 82 mounted in the main column of the machine and carries a bifurcated lever 83 of conventional construction adapted to co-operate with three trip dogs 84, 85, and 86 mounted on the broaching ram. In the normal running position of the shaft 80, illustrated in Figure 1, the shaft is rotated in a clockwise direction by trip dog 84 at completion of the broach return movement of the ram, and in a counterclockwise direction by the trip dog 85 upon completion of the normal broaching stroke of the ram. Suitable means are provided for retracting the shaft 80 after the affixed abutments 14 and 15 engage, and thereby shifting the bifurcated lever 83 out of the path of movement of the trip dog 85 and into the path of movement of the trip dog 86. Upon such shift of the shaft 80 the ram will not stop at the end of its broaching stroke but will continue downwardly carrying the finishing broach section 25 past the work until the trip dog 86 engages the lever 83, and thereby rotates the shaft 80 in its counterclockwise direction. It will be noted that the trip dog 84 is of sufficient width to engage and operate the lever 83 in both positions of adjustment of the shaft 80. A lever 87 pivoted to the column of the machine at 88 and having one end connected to the shaft 80 is normally actuated by spring 89 in a direction to hold the shaft 80 in the normal running position illustrated. A solenoid 90 connected to the opposite end of the lever 87 will, when energized, rotate the lever 87 in a counterclockwise direction and retract the shaft 80 to a position in which it permits the long stroke of the ram.

At the end of the complete broaching operation the abutment screws are returned to their outer or starting positions by means of a hydraulic motor 60 which drives a gear 61 that is in constant mesh with a gear 62 on shaft 39. This rewind operation, which occurs during a period when the clutch elements 31 and 32 are disengaged, is controlled by means of a solenoid valve illustrated in Fig. 5. As there shown, the control valve 63 is connected by means of a line 64 to the inlet of the motor 60 and by conduit 65 to the outlet. The conduit 64 communicates with a port 66, while conduit 65 communicates with a port 67 in the valve casing. The valve spool indicated generally at 68 is provided with three lands 69, 70, and 71. The valve casing is also provided with a port 72 in constant communication with the tank or other suitable source of liquid at low pressure and a port 73 which is in constant communication with the pump or source of communication under high pressure. The tank port 72 is in constant communication with a fifth valve port 74 through dotted line passageway indicated in Figure 5.

Figure 5:
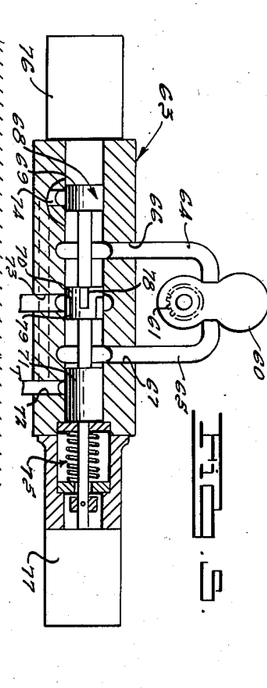
Figure 5 is a partial section and partial diagrammatic view of the rewind motor and its control valve.

The spool 68 is normally held in its central position illustrated by means of a spring centering device of conventional construction indicated generally at 75, and the spool may be shifted in either direction from its central position by means of one or the other of a pair of solenoids 76 and 77. In the central position of spool 68 ports 72 and 74 are blocked but ports 66 and 67 are connected together and to the pressure port 73 by means of the slots 78 and 79 in the land 70. Consequently, under these conditions the pressure applied to both sides of the motor 60 is equalized, and if the gear 61 is rotated incident to movement of the broaching ram the motor will act as a pump for circulating liquid freely through the valve 63 and back into the opposite side of the motor.

When it is desired to effect a rewind of the abutment screws, solenoid 77 is energized thereby pulling the spool 68 to the right into a position in which the land 78 blocks communication between ports 67 and 73, and opens communication between port 67 and port 72. Under these conditions fluid under pressure will pass through the valve and the line 64 to the motor 60 and will discharge through the line 65 and ports 67 and 72.

At the end of the rewind operation it is desirable to terminate the rewind operation when the abutment screws project to a predetermined amount. Accordingly, it is necessary not only to cut off the previously described connections to the motor 60 upon completion of the rewind operation but to block rotation of the rewind motor in order to absorb the momentum of the parts connected to it. This is accomplished by de-energizing solenoid 77 and momentarily energizing solenoid 76 at the instant that the abutment screws project to the desired degree. Energization of solenoid 76 pulls the spool 68 to the left into a position in which land 70 blocks communication between ports 73 and 66, and land 71 completely blocks port 67. This not only cuts off the admission of fluid to pressure through the line 64 but blocks the discharge of fluid through line 65, and consequently positively stops rotation of the motor. As soon as the motor has been brought to a stop in this manner, which requires but an instant, solenoid 76 may be de-energized permitting return of the spool to its central position. This de-energization of solenoid 76 is necessary in order to permit free rotation of the motor 60 during the broaching stroke.

A control slide 91, shown best in Figure 2, is connected to the rear end of the splined shafts 46 for movement therewith and carries suitable control instrumentalities responsive to movement of the slide for controlling energization of the long stroke solenoid 90 and the rewind solenoids 77 and 76. These instrumentalities may also effect a final stoppage of the machine upon completion of the broaching operation.

The entire cycle of operation of the machine may be controlled automatically by any suitable hydraulic, electric, or hydroelectric circuit. For example, control of the operation of the machine may be accomplished by means of the hydraulic circuit disclosed in the application of Benedict Welte, Serial No. 491,573, filed June 21, 1943, with the changes and additions hereinafter pointed out. Thus, the machine is provided with a starting handle 92 connected by means of a rod 93 to a starting valve 94 which corresponds to the starting valve 215 of the aforementioned application. This valve, as pointed out in greater detail in said application, incorporates means for returning the valve to neutral position upon release of the starting handle. A lug 95 secured to the rod 93 is adapted upon movement of the starting handle to neutral position to engage and close a switch 96 which is incorporated in the hereinafter described electrical circuit.

The machine is also provided with a valve 97 which corresponds to the valve 216 of the aforementioned application. The stem 98 of the valve 97 is shifted to the left, as viewed in Figure 1, by the aforementioned lever 53 under the influence of sleeve 48 of the abutment screw 17 when the table moves into broaching position. This movement of the stem 98 also rotates a bell crank lever 99 in a counterclockwise direction, as shown in Figure 1. The bell crank lever is connected by means of a link 100, a lever 101, a shaft 102, a lever 103, and a link 104 to a bell crank lever 105, which is pivoted to the frame of the machine in the vicinity of the cam slide 10 of the table cylinder 9. As a result, counterclockwise rotation of the bell crank lever 99, as viewed in Figure 1, shifts the bell crank lever 105 in a clockwise direction, as viewed in Figure 6. When the cam slide 10 moves to the position in which it fully retracts the table 3, a dog 107 on the cam slide engages and rotates the bell crank lever 105 in a counterclockwise direction, thereby returning the bell crank lever 99 and the stem 98 of valve 97 to the position illustrated in Figure 1. It will be noted that forward movement of the sleeve 48 of screw 17 has no effect upon the valve stem 98.

A normally open switch 108 is secured to the frame of the machine in such a manner that the operating member thereof will be engaged by the cam slide 10 and the switch closed when the table reaches its outermost position. This switch is also incorporated in the hereinafter described electrical circuit.

The previously described control shaft 80 is connected to the stem of a dual rotary valve 109 which corresponds to the dual valve 217—218 of the aforementioned Welt application.

In order to operate the clutch actuating cylinder and piston unit 35 of the present application in proper sequence, line 110 leading to the left-hand end of the cylinder, as viewed in Figure 3, is connected to line 144 of the aforementioned application while line 111 leading to the opposite end of the actuator 35 is connected to line 145 of said application. All the remainder of the hydraulic circuit of the aforementioned Welte application may be employed without change, except that the hydraulically operated indexing mechanism disclosed in said application for controlling the position of the spool 327 of stop valve 326 is omitted, and in lieu thereof the spool 327 is shifted to the right against the action of spring 340 upon energization of a solenoid under the control of the electrical circuit illustrated diagrammatically in Figure 7 of the present application where the solenoid is indicated by the numeral 112.

Figures 6, 7:
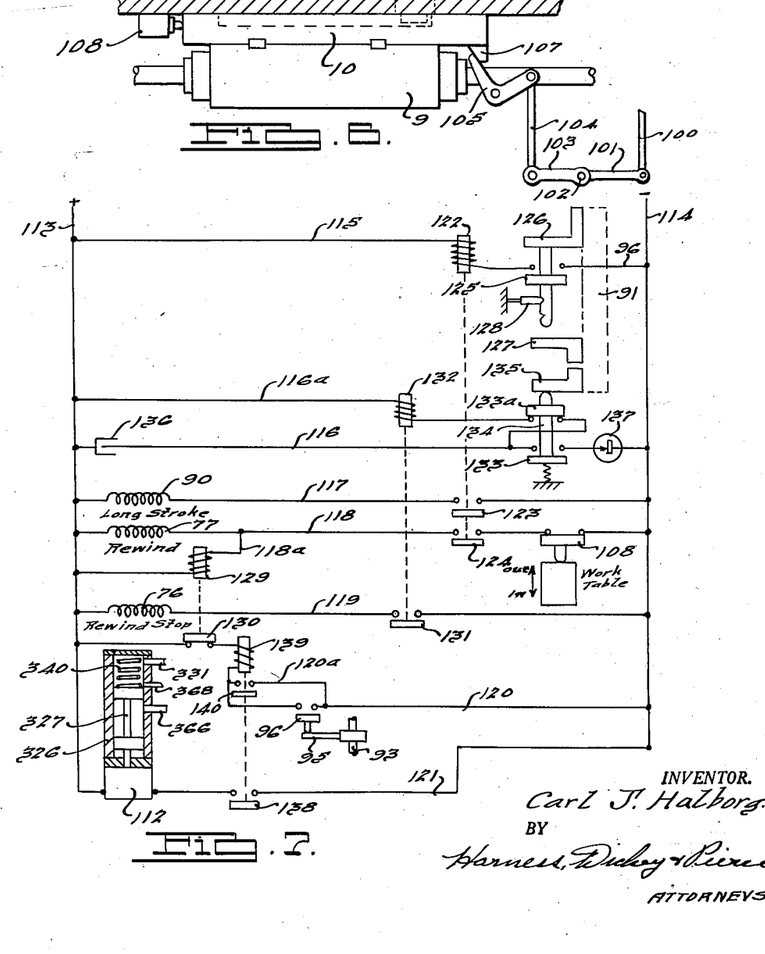
Figure 6 is a fragmentary sectional view taken on the line 6—6 of Figure 1.
Figure 7 illustrates diagrammatically the electrical portions of the control circuit of the machine.

Referring to Figure 7, the electrical control circuit comprises a pair of main electrical conduits 113 and 114 which are connected to any suitable source of electrical potential. Connected in parallel across the lines 113 and 114 are a plurality of lines 115, 116, 117, 118, 119, 120, and 121. Line 116 has in parallel with it a branch line 116a. Line 118 has a similar parallel branch line 118a, and line 120 also incorporates a parallel branch line 120a. Line 115 contains the coil of a relay 122 having two normally open contacts 123 and 124 located respectively in the lines 117 and 118. Line 115 is controlled by means of a microswitch 125 which is opened by means of a dog 126 fixed to the control slide 91 when the abutment screw 17 and the sleeve 48 reach their outermost or starting position, illustrated. The switch 125 is shifted to closed position by means of a dog 127 on the control slide 91 when the abutment screw 17 reaches the position which it occupies when the fixed abutments 14 and 15 engage. Any suitable means, indicated diagrammatically by the detent 128, is provided to retain the switch 125 in each of its two positions until it is positively actuated by one or the other of the dogs 126 and 127. The dog 126 may be adjustably fixed to the slide 91 in such a position that it just opens switch 125 when the abutment screw 17 occupies its starting position. The position of dog 127 may be adjusted so that it just closes switch 125 when the fixed abutments 14 and 15 are engaged.

With the above described adjustments of the dogs 126 and 127, the relay 122 will be energized when the abutments 14 and 15 engage, and will close contacts 123 and 124. Closure of contact 123 completes a circuit through line 117 and the solenoid 90, which is connected in the latter line, thereby shifting the control shaft 80 to the position in which it will cause the broaching ram to make its final long stroke. Closure of contact 124 at this time will not affect line 118 because that line will be open at switch 108 during the broaching stroke, and the abutments 14 and 15 will only come into contact with each other during the broaching operation when the worktable is in its inner position. However, as soon as the final long broaching stroke is complete the worktable will move out and, upon reaching its outermost position, will close switch 108 and complete the circuit through line 118. This will energize the rewind solenoid 77 to start rewinding the abutment screws 16 and 17. During such rewind of the abutment screws the broaching ram will return to its upper position. As soon as the rewind operation is complete dog 126 will open switch 125, thereby de-energizing relay 122 and opening contacts 123 and 124. This will terminate energization of the rewind solenoid 77. In order to insure that the machine will not start a new cycle upon completion of the broach return movement in the event that the rewind operation is incomplete, there is provided a relay 129 in the branch line 118a which relay is energized so long as the rewind solenoid 77 is energized. Relay 129 is provided with a normally closed contact 130 in the line 120 which, as hereinafter pointed out, controls the starting of a new cycle. As long as relay 129 is energized and contact 130 is open the machine cannot be started.

In order to momentarily energize the rewind blocking solenoid 76 upon completion of the rewind movement of the screws 116 and 117, there is provided in the line 119 a normally open contact 131 of a relay 132, the coil of which is connected in the aforementioned branch line 116a. Line 116a also contains a normally open contact 133a of a microswitch 134 which is moved to closed position by a dog 135 on the control slide 91 when the rewind operation is completed. Microswitch 134 also incorporates a normally closed contact 133 in line 116. Line 116 incorporates a condenser 136 which has sufficient capacity on discharging to energize the relay 132 for a sufficient period of time to insure that the rewinding mechanism will be positively stopped. If the electrical potential applied to the lines 113 and 114 is an alternating current the line 116 must also incorporate a rectifier indicated diagrammatically at 137. This rectifier will be unnecessary if the lines 113 and 114 are connected to a direct current source.

The operation of the rewind blocking control mechanism just described is as follows: When the machine is in starting position line 116 will be open at contact 133, thus likewise disconnecting line 116a from line 114 but leaving the lines 116a and 116 connected in parallel through the closed contact 133a. As soon as the abutment screw 17 starts to retract during the broaching operation dog 135 will disengage microswitch 134, thus permitting contact 133a to open, and contact 133 to close, and that condition will continue to exist throughout the broaching cycle until the rewind operation is completed. Under these conditions direct current will flow through the line 116 and charge the condenser 136. When the rewind operation is complete dog 135 will open contact 133 and close contact 133a, thus permitting the condenser 136 to discharge through and thereby energize the relay 132. As soon as the condenser is fully discharged, which preferably should occur in a few seconds, relay 132 will be de-energized and open its contact 131 in the rewind stop circuit 119. As long as the capacity of the condenser 136 is so selected that it will discharge completely in less time than is required for the worktable to move into broaching position there will be no danger of the broaching stroke starting while the rewind stop solenoid 76 is energized.

As previously indicated the cycle control valve 326 of the aforementioned Welte application, which is indicated with identical numerals on the corresponding parts in the present application, is normally held in the position illustrated in Figure 7 by spring 340. So long as the valve is in that position the machine will come to a stop upon completion of the broach return movement, as described in greater detail in said Welte application. The spool 327 of valve 326 is shifted upwardly, as viewed in Figure 7, by solenoid 112 connected in the aforementioned line 121, and when so shifted starts the machine and causes it to perform a continuous series of successive broaching operations so long as the solenoid is energized. Line 121 is controlled by a normally open contact 138 of a relay 139 connected in line 120. Relay 139 also contains a second normally open contact 140 in the parallel branch holding circuit 120a which is connected across the previously mentioned switch 96.

With the parts in the starting position illustrated, shifting of the starting handle 92 to starting position closes switch 96, thereby energizing relay 139 and establishing a branch holding circuit through line 120a to maintain energization of line 120 after the starting handle has returned to neutral position and switch 96 has opened. As long as relay 139 remains energized contact 138 will be closed and solenoid 112 will be energized, thus permitting a continuous repetition of broaching cycles, each cycle including in succession an advance of the table to broaching position, a broaching stroke of the ram (during which the table feeds in), a return of the table to starting position and a return of the ram to starting position.

As previously indicated, relay 129 will be energized to open contact 130 at the start of the abutment screw rewind operation which occurs as soon as the worktable reaches its outermost position after contact of the fixed abutments 14 and 15. The opening of contact 130 de-energizes the relay 139, thereby breaking the holding circuit 120a and de-energizing the solenoid 112. As a result, upon completion of the broach return stroke which starts simultaneously with the rewind operation, the machine will come to an automatic stop and cannot be restarted except by operation of the starting handle 92, and only then after the rewind operation has completed.

It is apparent that there is provided, in accordance with the present invention, a surface broaching machine which, with a single permanent broaching tool, may be employed in a tool room or in a job shop on the production of a wide variety of parts. For example, one relatively wide, flat broach may be used for all types of flat surfacing operations. To cut grooves it is necessary to provide a broach of the proper width, but this may be done in many cases by a combination of two or more broaches of narrow width arranged to cut successively on each stroke. It is only necessary to locate an appropriate surface broach of the unstepped type previously mentioned on the ram and adjust the limit switch dogs 126 and 135 to control the total depth of cut, and the machine will operate automatically through whatever number of strokes are required to remove metal to the desired depth, following which it will make a final stroke of additional length to finish the part, and then come to a stop. Just prior to or immediately after the stoppage of the machine, the rewind of the abutment screws to their initial position will be completed and the machine will be in condition for restarting. If necessary, the depth of cut per tooth may be readily adjusted by substituting a different set of change-speed gears for the gears 37 and 38. No other changes or adjustments on the machine are required.

The unstepped broach employed by the machine is much easier and less expensive to manufacture than a conventional surface broach, and when used in the present machine is applicable to a wide range of operations as compared with a conventional broach.

An important feature of the machine resides in the provision of an irreversible drive for feeding the worktable into the broach during the broaching stroke, in combination with means other than the broach for resisting movement of the worktable toward the broach in order to take up all play in the drive mechanism and thereby avoid chatter. While it is preferred to utilize the means for resisting table movement to control the speed of infeed, it is apparent that the speed may be controlled by controlling the speed of the table driving motor in which event the resisting means need only exert sufficient force to prevent chatter. Likewise, while it is preferred to maintain the desired synchronous relation between the table feed and the ram movement by interlocking the two in some manner, satisfactory results can be achieved by maintaining the movement of each at a constant speed in any suitable manner.

Another important feature of illustrated embodiment of the invention resides in the fact that all of the forces involved in the feed of the broach into the work are direct compression forces against solid abutments. Consequently, there is no possibility of tool chatter occurring due to yielding of or play between any of the structural parts. While it is preferred to employ one or more screws, such as the screws 16 and 17, to act as movable abutments for the table, it is apparent that any other form of self-locking cam driven by the broaching ram or otherwise will serve the same purpose. For the sake of simplicity, it is preferred to employ removable change-speed gearing for changing the depth of cut per tooth, but it is obvious that any form of positive variable speed transmission mechanism may be incorporated in the machine if desired.

Other modifications and alterations in the detailed construction of the machine may be indulged in without departing from the spirit of the inventon or the scope of the appended claims.

What is claimed is:

1. In a surface broaching machine, a broaching ram, a work supporting table mounted for movement toward and from the ram, means for moving the table toward the ram, an irreversible mechanical drive connection between said means and the table, means for resisting movement of the table toward the ram, one of said means having a constant speed characteristic, and means for moving the broaching ram through a broaching stroke during movement of the table toward the ram to effect a broaching operation.

2. In a surface broaching machine, a broaching ram, a work supporting table mounted for movement toward and from the ram, means for moving the table toward the ram, an irreversible mechanical drive connection between said means and the table, means for resisting movement of the table toward the ram, the movement of one of said means being synchronized with that of the broaching ram, and means for moving the broaching ram through a broaching stroke during movement of the table toward the ram to effect a broaching operation.

3. In a surface broaching machine, a broaching ram, a work supporting table mounted for movement toward and from the ram, means for moving the table toward the ram, an irreversible mechanical drive connection between said means and the table, means for resisting movement of the table toward the ram, means for moving the broaching ram through a broaching stroke during movement of the table toward the ram to effect a broaching operation, and means to positively stop movement of the table toward the broaching ram during the broaching operation, said means for moving the broaching ram being effective to continue a broaching stroke after the table has stopped.

4. In a surface broaching machine, a broaching ram, a work supporting table mounted for movement toward and from the ram, means for moving the table toward the ram, an irreversible mechanical drive connection between said means and the table, means for resisting movement of the table toward the ram, one of said means having a constant speed characteristic, means for moving the broaching ram through a broaching stroke during movement of the table toward the ram to effect a broaching operation, and means to positively stop movement of the table toward the broaching ram during the broaching operation, said means for moving the broaching ram being effective to continue a broaching stroke after the table has stopped.

5. In a surface broaching machine, a broaching ram, a work supporting table mounted for movement toward and from the ram, means for moving the table toward the ram, an irreversible mechanical drive connection between said means and the table, means for resisting movement of the table toward the ram, the movement of one of said means being synchronized with that of the broaching ram, means for moving the broaching ram through a broaching stroke during movement of the table toward the ram to effect a broaching operation, and means to positively stop movement of the table toward the broaching ram during the broaching operation, said means for moving the broaching ram being effective to continue a broaching stroke after the table has stopped.

6. In a surface broaching machine, a reciprocating broaching ram adapted to carry a broaching tool, a work supporting table mounted for movement toward and from the path of movement of the ram, means for moving the worktable toward the ram and exerting a force on the table during the broaching stroke sufficient to overcome the thrust of the broaching tool, means forming an abutment to limit movement of the worktable toward the ram, and means for shifting said abutment means during the broaching stroke of the ram in order to permit said first means to feed the work toward the ram during the broaching stroke.

7. In a surface broaching machine, a reciprocating broaching ram adapted to carry a broaching tool, a work supporting table mounted for movement toward and from the path of movement of the ram, means for moving the worktable toward the ram and exerting a force on the table during the broaching stroke sufficient to overcome the thrust of the broaching tool, means independent of the broaching tool forming an abutment to limit movement of the worktable toward the ram when the table reaches broaching position, and means independent of the force exerted on the work by the broaching tool and of the force exerted on the abutment by the table for shifting said abutment means during the broaching stroke of the ram in order to permit said first means to feed the work toward the ram during the broaching stroke.

8. In a surface broaching machine, a reciprocating broaching ram adapted to carry a broaching tool, a work supporting table mounted for movement toward and from the path of movement of the ram, means for moving the worktable toward the ram and exerting a force on the table during the broaching stroke sufficient to overcome the thrust of the broaching tool, means forming an abutment to limit movement of the worktable toward the ram, and means driven by the ram for shifting said abutment means during the broaching stroke of the ram in order to permit said first means to feed the work toward the ram during the broaching stroke, and means for varying the rate of feed.

9. In a surface broaching machine, a reciprocating broaching ram adapted to carry a broaching tool, a work supporting table mounted for movement toward and from the path of movement of the ram, hydraulically operated means for moving the table toward the ram and exerting a force on the table during the broaching stroke sufficient to overcome the thrust of the broaching tool, a cam type abutment for limiting movement of the worktable toward the ram, said cam type abutment means having an effective angle such that no force exerted by the table on the abutment means will move said abutment means, and means for operating the abutment means during the broaching stroke of the ram in order to permit said hydraulically operated means to feed the work toward the broach during the broaching stroke.

10. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, means for operating the cam to advance the table toward the ram, means forming an abutment to limit movement of the worktable toward the ram, and means synchronized with the broaching stroke of the ram for shifting the abutment means during the broaching stroke of the ram in order to permit said cam to feed the work toward the broach during the broaching stroke.

11. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, means for operating the cam to advance the table toward the ram, a cam type abutment means for limiting movement of the table toward the ram, said cam type abutment means having an effective angle such that no force exerted by the table on the abutment means will move said abutment means, and means for operating the cam abutment means during the broaching stroke to withdraw the abutment and thereby permit said table moving cam to feed the work toward the broach during the broaching stroke.

12. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, hydraulic means for operating the cam to advance the table toward the ram, screw operated abutment means for limiting movement of the table toward the ram, and means for rotating the screw during the broaching stroke to withdraw the abutment and thereby permit said hydraulically operated cam to feed the work toward the broach during the broaching stroke.

13. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, hydraulic means for operating the cam to advance the table toward the ram, screw operated abutment means for limiting movement of the table toward the ram, and means synchronized with the movement of the ram for rotating the screw during the broaching stroke to withdraw the abutment and thereby permit said hydraulically operated cam to feed the work toward the broach during the broaching stroke.

14. In a surface broaching machine, a reciprocating broaching ram adapted to carry a broaching tool, a work supporting table mounted for movement toward and from the path of movement of the ram, means for moving the worktable toward the ram and exerting a force on the table during the broaching stroke sufficient to overcome the thrust of the broaching tool, means forming an abutment to limit movement of the worktable toward the ram, means for shifting said abutment means during the broaching stroke of the ram in order to permit said table moving means to feed the work toward the ram during the broaching stroke, and auxiliary abutment means providing a fixed stop for the table during the finishing stroke.

15. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, means for operating the cam to advance the table toward the ram, means forming an abutment to limit movement of the worktable toward the ram, means for successively shifting the abutment means during each broaching stroke of the ram in a direction to permit said cam to feed the worktable successively toward the broach during successive broaching strokes, means for automatically effecting repeated broaching strokes of the ram, and means for stopping the infeed of the table after the broach has cut to a predetermined depth.

16. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, means for operating cam to advance the table toward the ram, means forming an abutment to limit movement of the worktable toward the ram, means synchronized with the broaching stroke of the ram for successively shifting the abutment means during each broaching stroke of the ram in a direction to permit said cam to feed the worktable successively toward the broach during successive broaching strokes, means for automatically effecting repeated cutting strokes of the ram, and means for stopping the infeed of the table after the broach has cut to a predetermined depth.

17. In a surface broaching machine, a reciprocating broaching ram adapted to carry a broaching tool, a work supporting table mounted for movement toward and from the path of movement of the ram, means for moving the worktable toward the ram and exerting a force on the table during the broaching stroke sufficient to overcome the thrust of the broaching tool, means forming an abutment to limit movement of the worktable toward the ram, means for successively shifting said abutment means during each broaching stroke of the ram in a direction to permit said table moving means to feed the work table successively toward the ram during successive broaching strokes, a fixed abutment for limiting movement of the table toward the ram at a point corresponding to the desired depth of cut, means for automatically effecting repeated cutting strokes of the ram, and means operable automatically after the broach has cut to a predetermined depth for returning the movable abutment means to starting position and stopping the machine.

18. In a surface broaching machine, a reciprocating broaching ram adapted to carry a broaching tool, a work supporting table mounted for movement toward and from the path of movement of the ram, means to feed the worktable progressively toward the broach during successive broaching strokes of the ram, and means operable after a predetermined number of broaching strokes to decrease the rate of feed of the table on a subsequent broaching stroke.

19. In a surface broaching machine, a reciprocating broaching ram adapted to carry a broaching tool, a work supporting table mounted for movement toward and from the path of movement of the ram, means for moving the table toward the ram during the broaching stroke, movable abutment means for limiting movement of the worktable toward the ram, means for operating said abutment means during the broaching stroke of the ram in a direction to permit said table moving means to feed the work toward the broach at a predetermined rate during the first portion of the broaching operation and at a reduced rate during a later portion of the broaching operation, and a fixed abutment effective to stop movement of the table when the broach has cut to a predetermined depth.

20. In a surface broaching machine, a reciprocating broaching ram adapted to carry a broaching tool, a work supporting table mounted for movement toward and from the path of movement of the ram, means for moving the table toward the ram during the broaching stroke, movable abutment means for limiting movement of the worktable toward the ram, means for operating said abutment means successively during each broaching stroke of the ram in order to permit said table moving means to feed the work toward the broach at a predetermined rate during the first portion of the broaching operation and at a reduced rate during the later portion of the broaching operation, a fixed abutment effective to stop movement of the table when the broach has cut to a predetermined depth, means for automatically effecting repeated strokes of the ram, and means for stopping infeed of the table after the table has engaged the fixed abutment.

21. In a surface broaching machine, a reciprocating broaching ram adapted to carry a broaching tool, a work supporting table mounted for movement toward and from the path of movement of the ram, means for moving the worktable successively toward the ram during successive broaching strokes, means for automatically effecting repeated broaching strokes of the ram of less length than the length of the broaching tool, means for stopping infeed of the table after the broach has cut to a predetermined depth, means for causing the ram to make a broaching stroke of greater length after the infeed has stopped, and means for stopping the machine after said last mentioned broaching stroke.

22. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, means for operating the cam to advance the table toward the ram, means forming an abutment to limit movement of the worktable toward the ram, means for successively shifting the abutment means during each broaching stroke of the ram in order to permit said cam to feed the worktable successively toward the broach during successive broaching strokes, means for automatically effecting repeated broaching strokes of the ram of less length than the length of the broaching tool, means for stopping infeed of the table after the broach has cut to a predetermined depth, means for causing the ram to make a broaching stroke of greater length after the infeed has stopped, and means for stopping the machine after said last mentioned broaching stroke.

23. In a surface broaching machine, a reciprocating broaching ram adapted to carry a broaching tool, a work supporting table mounted for movement toward and from the path of movement of the ram, means for moving the worktable toward the ram and exerting a force on the table during the broaching stroke sufficient to overcome the thrust of the broaching tool, means forming an abutment to limit movement of the worktable toward the ram, means for successively shifting said abutment means during each broaching stroke of the ram in a direction to permit said table moving means to feed the worktable successively toward the ram during successive broaching strokes, means for automotically effecting repeated strokes of the ram of less length than the length of the broaching tool, a fixed abutment for limiting movement of the table toward the ram when the broach has cut to predetermined depth, means for causing the ram to make a broaching stroke of greater length after the table has engaged said fixed abutment, means for retracting the table after said last mentioned stroke, means for returning the abutment to starting position, and means for stopping the machine upon return of the ram following said last mentioned broaching stroke.

24. In a surface broaching machine, a reciprocating broaching ram adapted to carry a broaching tool, a work supporting table mounted for movement toward and from the path of movement of the ram, a cam for moving the table toward the ram, said cam having a portion having an effective angle such that force exerted on the table by the broach during the broaching stroke cannot move the table, means for operating the cam to advance the table toward the ram, means forming an abutment to limit movement of the worktable toward the ram, means for successively shifting the abutment means during each broaching stroke of the ram in a direction to permit said cam to feed the worktable successively toward the broach during successive broaching strokes, means for automatically effecting repeated strokes of the ram of less length than the length of the broaching tool, a fixed abutment for limiting movement of the table toward the ram when the broach has cut to predetermined depth, means for causing the ram to make a broaching stroke of greater length after the table has engaged said fixed abutment, and means for stopping the machine after said last mentioned 25. In a surface broaching machine, a reciprocating broaching ram adapted to carry a broaching tool, a work supporting table mounted for movement toward and from the path of movement of the ram, means for moving the table toward the ram during the broaching stroke, a pair of movable abutments for limiting movement of the table toward the ram, one of said abutments being initially positioned closer to the table than the second abutment, means for moving both abutments simultaneously during the broaching stroke of the ram in a direction to permit said table moving means to feed the work toward the ram during the broaching stroke, said last mentioned means being effective to move said one abutment at a more rapid rate than the second abutment so that the first abutment overtakes the second abutment during the broaching operation, and thereafter said second abutment is effective to limit movement of the table to a reduced rate of speed.

26. In a surface broaching machine, a reciprocating broaching ram adapted to carry a broaching tool, a work supporting table mounted for movement toward and from the path of movement of the ram, means for moving the table toward the ram during the broaching stroke, means forming an abutment to limit movement of the worktable toward the ram, means for automatically effecting repeated cutting strokes of the ram, means for progressively shifting said abutment means during each cutting stroke in a direction to permit said table moving means to feed the worktable progressively toward the ram during successive cutting strokes, and means for stopping the machine and returning said abutment means to its starting position after the broach has cut to a predetermined depth.

27. In a surface broaching machine, a reciprocating broaching ram adapted to carry a broaching tool, a work supporting table mounted for movement toward and from the path of movement of the ram, means for moving the worktable toward the ram during the broaching stroke, means forming an abutment to limit movement of the worktable toward the ram, means for automatically effecting repeated cutting strokes of the ram, means for progressively shifting said abutment means during each cutting stroke in a direction to permit said table moving means to feed the worktable progressively toward the ram during successive cutting strokes, means for stopping the infeed of the table when the broach has cut to predetermined depth, a motor for returning the abutment to starting position, means for starting said motor upon completion of the broaching movement of the abutment means and means for blocking return movement of said abutment means when it reaches starting position.

CARL J. HALBORG.

REFERENCES CITED

The following references are of record in the file of this patent:

UNITED STATES PATENTS

| Number | Name | Date |
|---|---|---|
| 1,275,883 | Embree | Aug. 13, 1918 |
| 1,467,525 | Banker | Sept. 11, 1923 |
| 1,867,592 | Richards | July 19, 1932 |
| 2,203,803 | Vancil et al. | June 11, 1940 |
| 2,251,154 | Nenninger et al. | July 29, 1941 |
| 2,308,689 | Hawley, Sr., et al. | Jan. 19, 1943 |

Certificate of Correction

Patent No. 2,459,697.  January 18, 1949.

CARL J. HALBORG

It is hereby certified that error appears in the printed specification of the above numbered patent requiring correction as follows:

Column 17, line 74, claim 24, after the word "mentioned" insert *broaching stroke.*; and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*